United States Patent [19]

Woebcke et al.

[11] 4,356,151

[45] * Oct. 26, 1982

[54] SOLIDS QUENCH BOILER

[75] Inventors: Herman N. Woebcke, Stamford, Conn.; Arju H. Bhojwani, Lawrenceville, N.J.; Robert J. Gartside, Auburndale, Mass.

[73] Assignee: Stone & Webster Engineering Corp., Boston, Mass.

[*] Notice: The portion of the term of this patent subsequent to Sep. 28, 1999, has been disclaimed.

[21] Appl. No.: 165,784

[22] Filed: Jul. 3, 1980

Related U.S. Application Data

[63] Continuation-in-part of Ser. No. 82,162, Oct. 5, 1979.

[51] Int. Cl.³ .......................... F27B 15/16; B01J 8/28; B01J 8/30; B01J 8/24
[52] U.S. Cl. .......................... 422/145; 165/104.18; 208/48 Q; 208/127; 422/142; 422/146
[58] Field of Search .............. 422/142, 145, 146, 230, 422/231, 232, 233, 235; 165/104 F, 107, 104.16, 104.18; 122/7 R; 208/48 Q, 127

[56] References Cited

U.S. PATENT DOCUMENTS

| | | | |
|---|---|---|---|
| 2,433,726 | 12/1947 | Angell | 422/142 |
| 2,943,922 | 7/1960 | Daniels | 422/145 |
| 3,224,869 | 12/1965 | Keith et al. | 422/142 X |
| 3,583,476 | 6/1971 | Woebcke et al. | 165/1 |
| 3,718,708 | 2/1973 | Ozawa et al. | 208/48 Q X |
| 3,898,043 | 8/1975 | Schutte et al. | 422/142 X |
| 4,061,562 | 12/1977 | McKinney et al. | 208/127 X |
| 4,097,363 | 6/1978 | McKinney et al. | 208/127 X |

*Primary Examiner*—Barry S. Richman
*Attorney, Agent, or Firm*—Hedman, Casella, Gibson & Costigan

[57] ABSTRACT

Apparatus for quenching and cooling the reactor effluent in a thermal regenerative cracking (TRC) system. The quench apparatus includes a section for introducing relatively cool particulate solids into a hot effluent stream to effect initial quenching and a section to further cool the composite of quenched effluent and solids.

6 Claims, 5 Drawing Figures

SOLIDS QUENCH BOILER

CROSS REFERENCE TO RELATED CASE

This is a continuation-in-part of application Ser. No. 06/082,162, filed Oct. 5, 1979.

BACKGROUND OF THE INVENTION

1. Field of the Invention

The invention relates generally to quenching furnace effluent. More particularly, the invention relates to a process and apparatus for quenching effluent cracked in a furnace using inert solid particles to provide the reaction heat. The invention is particularly adapted for embodiment in an apparatus and process for use in the Thermal Regenerative Cracking (TRC) process, as described in U.S. Pat. No. 4,061,562 to McKinney et al and U.S. Pat. No. 4,097,363 to McKinney et al.

2. Description of the Prior Art

In the technology of thermally cracking hydrocarbon feedstocks to produce olefins, it has long been necessary to stop the reaction of the cracked effluent by rapidly cooling the effluent. Various techniques and apparatus have been provided to facilitate quenching. Both direct quench, wherein a fluid material is introduced directly into the effluent stream, and indirect quench, wherein heat exchange is performed by heat transfer through the walls separating the hot and cold side of the exchanger are commonly employed. An illustration of the indirect heat exchanger is shown in U.S. Pat. No. 3,583,476 (Herman N. Woebcke et al).

Process and equipment have been recently developed to crack hydrocarbons in tubular reactors employing solid-gas contact. The solids are essentially inert particulate materials which are heated to high temperatures and intimately mixed with the hydrocarbon feedstock to provide the heat necessary to crack the hydrocarbon.

The existing solid-gas contact processes employing inert particulate solids to provide the heat necessary for reaction typically separate the particulate solids from the gas before quench occurs. An illustration is seen in Patent Application Ser. No. 055,148 filed July 6, 1979 (Gartside et al), now U.S. Pat. No. 4,288,235 issued Sept. 8, 1981.

However, in the noncatalytic temperature dependent endothermic reaction processes, systems have been developed to quench the entire products stream after the requisite reaction period. The problem is that with heavy feedstocks at high severities, short residence times are desirable. The combination of heavy feedstock, high severity and short residence times impose severe operating problems on the heat recovery devices.

In connection with a current TRC installation, a 90% separation occurs in the primary separator. This is followed by an oil quench to 1300° F., and a cyclone to remove the remainder of the solids. The mix is then quenched again with liquid to 600° F. Thus, all the available heat from the reaction outlet temperature to 600° F. is rejected to a circulating oil stream. Steam is generated from this oil at 600 psig, 500 F. The subject invention is used to avoid exchanger fouling when cracking heavy feeds at low steam dilutions and high severities in the TRC. However, instead of an oil quench, a circulating solids stream could be used to quench the effluent. As in the reaction itself, the coke would be deposited preferentially on the solids thus avoiding fouling. These solids can be held at 800° F. or above, thus permitting the generation of high pressure steam (1500 psig+) which increases the overall thermal efficiency of the process. The oil loop can not operate at these temperatures due to instabilities (too many light fractions are boiled off, yielding an oil that is too viscous).

SUMMARY OF THE INVENTION

It is an object of the present invention to provide a solid quench system and apparatus capable of quenching the composite cracked effluent and particulate solids discharged from the reactor fed with heavy feed stocks and operated at high severity and short residence times.

It is another object of the present invention to generate 1,500 psig steam under any operating conditions imposed by the reactor.

It is a further object to provide a solids quench system uniquely suited for rapid quench of furnace effluent generated by noncatalytic temperature dependent endothermic systems utilizing particulate solids to provide the heat for cracking.

Thus, a process and apparatus have been provided to quench the stream of effluent and particulate solids discharged from a tubular reactor heated by the particulate solids in a TRC installation. The process and apparatus operate to introduce particulate solids into the effluent stream and also pass the effluent-particulate solids mixture in indirect heat exchange relationship with steam. In one embodiment a fluid bed quench riser is used to introduce the additional particulate solids into the stream and a quench exchanger close coupled to the quench riser is provided to effect the indirect heat exchange. The quench exchanger has a plurality of concentrically arrayed tubes extending longitudinally to the exchanger axis over which the stream of effluent and particulate solids pass in indirect heat exchange relationship.

In the process of quenching, the effluent from the reactor with entrained particulate solids enters the fluidized bed quench riser and by an eductor effect draws particulate solids, at a temperature much lower than the effluent temperature, into the quench boiler. The effluent and particulate solids pass in heat exchange relationship with steam in the tubes on the cold side of the quench exchanger and are cooled to the desired quench gas outlet temperature. Concomitantly, high pressure steam is generated in the cold side of the quench exchanger.

Apparatus for separating the particulate solids from the quench gas is provided downstream of the quench exchanger. A return leg for the separated solids to be delivered to the fluidized bed quench riser and outlet for the cracked gas are also included in the system.

In an alternative embodiment the quench riser is not used. The quench boiler is provided with the same plurality of concentrically arrayed longitudinal tubes, however the particulate solids are introduced directly into the reactor outlet tube at the entry end of the quench boiler.

DESCRIPTION OF THE DRAWINGS

The invention will be better understood when viewed with the following drawings wherein.

DESCRIPTION OF THE PREFERRED EMBODIMENT

The solids quench boiler process and apparatus of the present invention are suitable for use in any application wherein a very rapid rate of quenching is required and the generation of high pressure steam is desirable without accumulation of tar or coke on the boiler tube surface, and thus the subject invention is particularly well adapted for use in the Thermal Regenerative Cracking (TRC) process.

Figure 1:
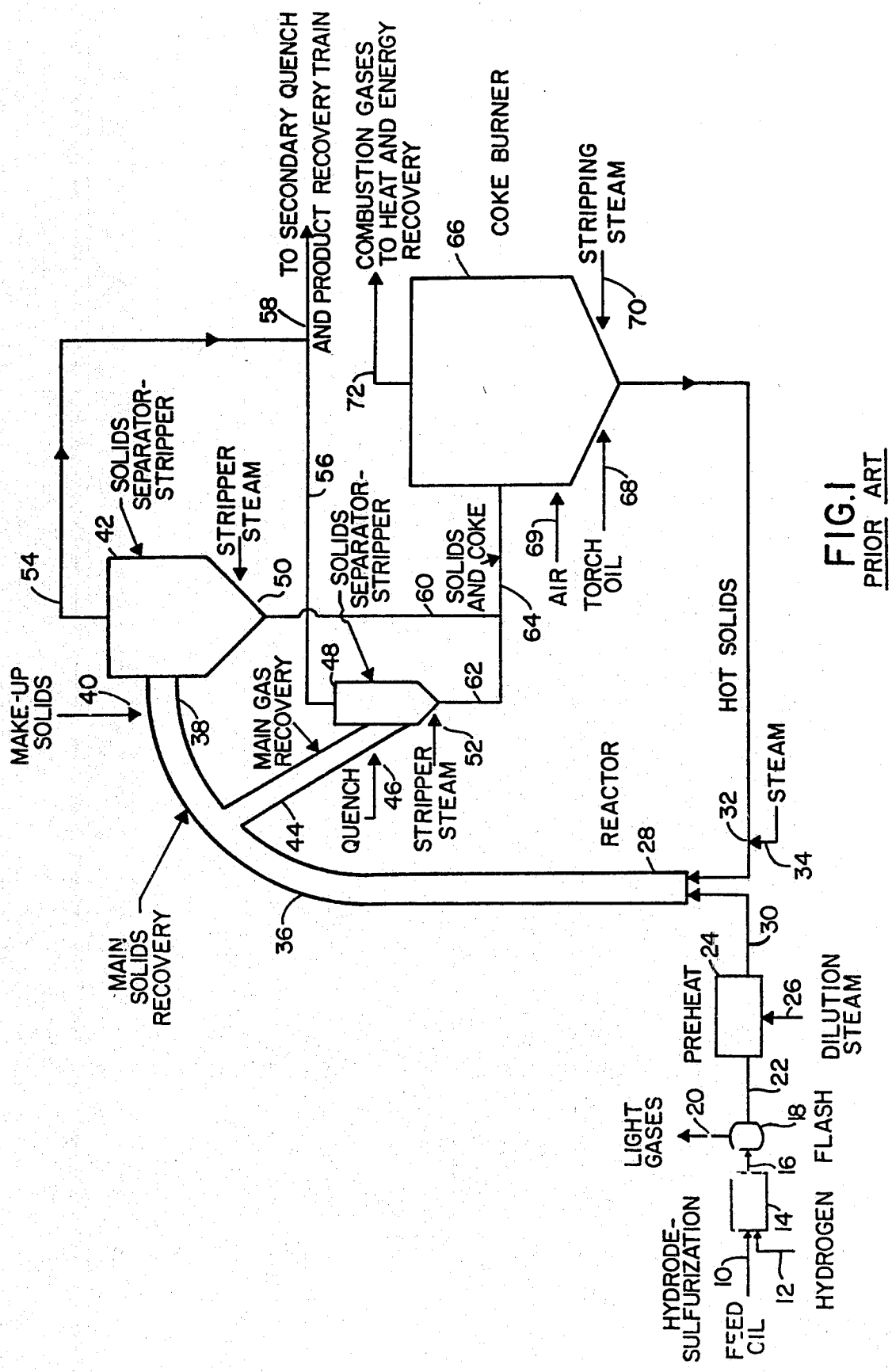
FIG. 1 is a schematic diagram of a TRC system and process according to the prior art.

Referring to FIG. 1, in the prior art TRC process and system, thermal cracker feed oil or residual oil, with or without blended distillate heavy gas, entering through line 10 and hydrogen entering through line 12 pass through hydrodesulfurized zone 14. Hydrosulfurization effluent passes through line 16 and enters flash chamber 18 from which hydrogen and contaminating gases including hydrogen sulfide and ammonia are removed overhead through line 20, while flash liquid is removed through line 22. The flash liquid passes through preheater 24, is admixed with dilution steam entering through line 26 and then flows to the bottom of thermal cracking reactor 28 through line 30.

A stream of hot regenerated solids is charged through line 32 and admixed with steam or other fluidizing gas entering through line 34 prior to entering the bottom of riser 28. The oil, steam and hot solids pass in entrained flow upwardly through riser 28 and are discharged through a curved segment 36 at the top of the riser to induce centrifugal separation of solids from the effluent stream. A stream containing most of the solids passes through riser discharge segment 38 and can be mixed, if desired, with make-up solids entering through line 40 before or after entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through lines 54 and 56, respectively, and then combined in line 58 for passage to a secondary quench and product recovery train, not shown. Coke-laden solids are removed from solids separators 42 and 48 through lines 60 and 62, respectively, and combined in line 64 for passage to coke burner 66. If required, torch oil can be added to burner 66 through line 68 while stripping steam may be added through line 70 to strip combustion gases from the heated solids. Air is charged to the burner through line 69. Combustion gases are removed from the burner through line 72 for passage to heat and energy recovery systems, not shown, while regenerated hot solids which are relatively free of coke are removed from the burner through line 32 for recycle to riser 28. In order to produce a cracked product containing ethylene and molecular hydrogen, petroleum residual oil is passed through the catalytic hydrodesulfurization zone in the presence of hydrogen at a temperature between 650° F. and 900° F., with the hydrogen being chemically combined with the oil during the hydrocycling step. The hydrosulfurization residual oil passes through the thermal cracking zone together with the entrained inert hot solids functioning as the heat source and a diluent gas at a temperature between about 1300° F. and 2500° F. for a residual time between about 0.05 to 2 seconds to produce the cracked product and ethylene and hydrogen. For the production of ethylene by thermally cracking a hydrogen feed at least 90 volume percent of which comprises light gas oil fraction of a crude oil boiling between 400° F. and 650° F., the hydrocarbon feed, along with diluent gas and entrained inert hot gases are passed through the cracking zone at a temperature between 1300° and 2500° F. for a residence time of 0.05 to 2 seconds. The weight ratio of oil gas to fuel oil is at least 0.3, while the cracking severity corresponds to a methane yield of at least 12 weight percent based on said feed oil. Quench cooling of the product immediately upon leaving the cracked zone to a temperature below 1300° F. ensures that the ethylene yield is greater than the methane yield on a weight basis.

Figure 2:
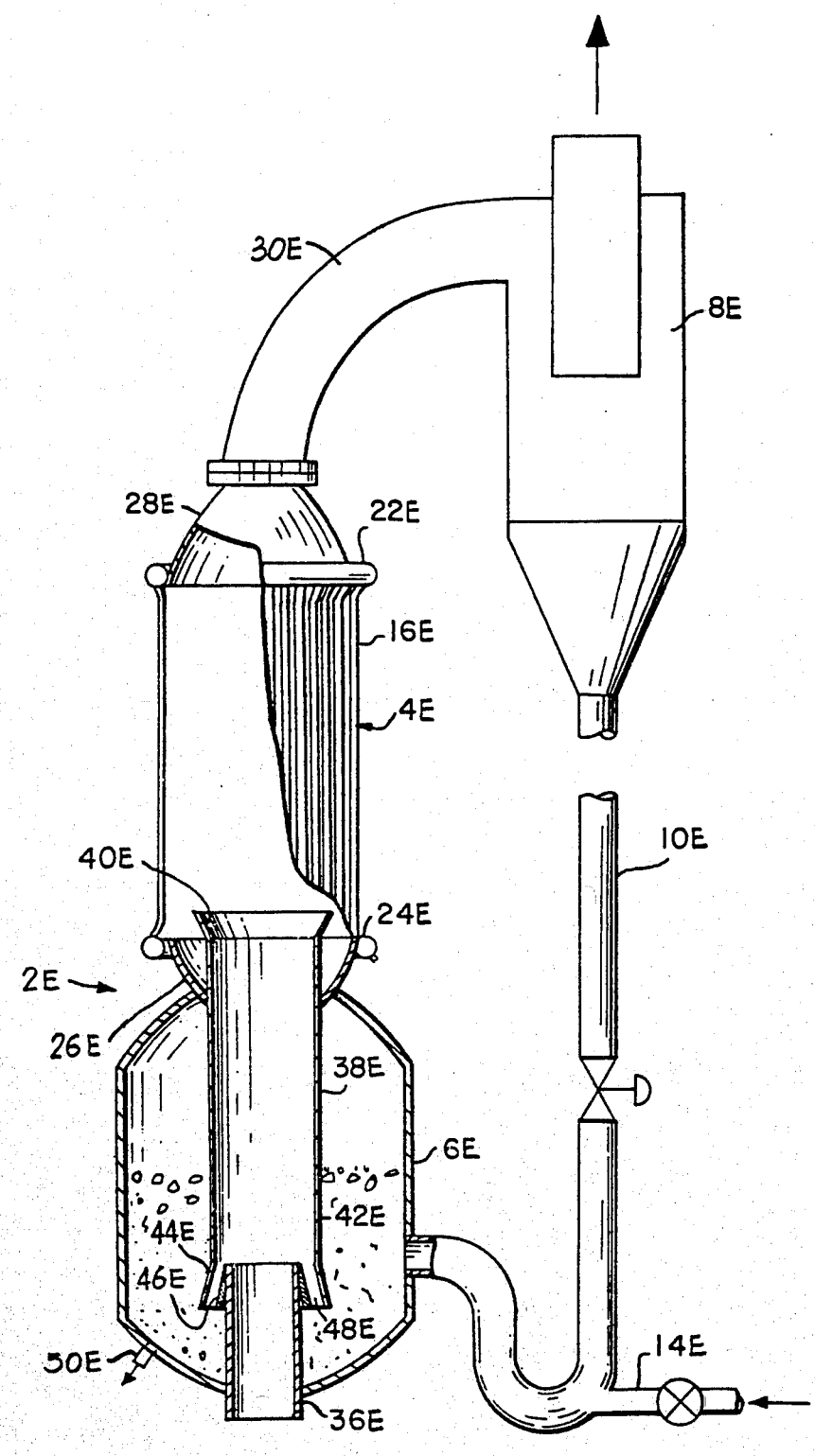
FIG. 2 is a sectional elevational view of the solids quench boiler using the quench riser.

As seen in FIG. 2, in lieu of quench zone 44, 46 (see FIG. 1) of the prior art, the composite solids quench boiler 2E of the subject invention is comprised essentially of a quench exchanger 4E, a fluid bed-quench riser 6E, a cyclone separator 8E with a solids return line 10E to the fluid bed-riser 6E and a line 14E for the delivery of gas to the fluid bed-quench riser.

Figures 3, 4, 5:
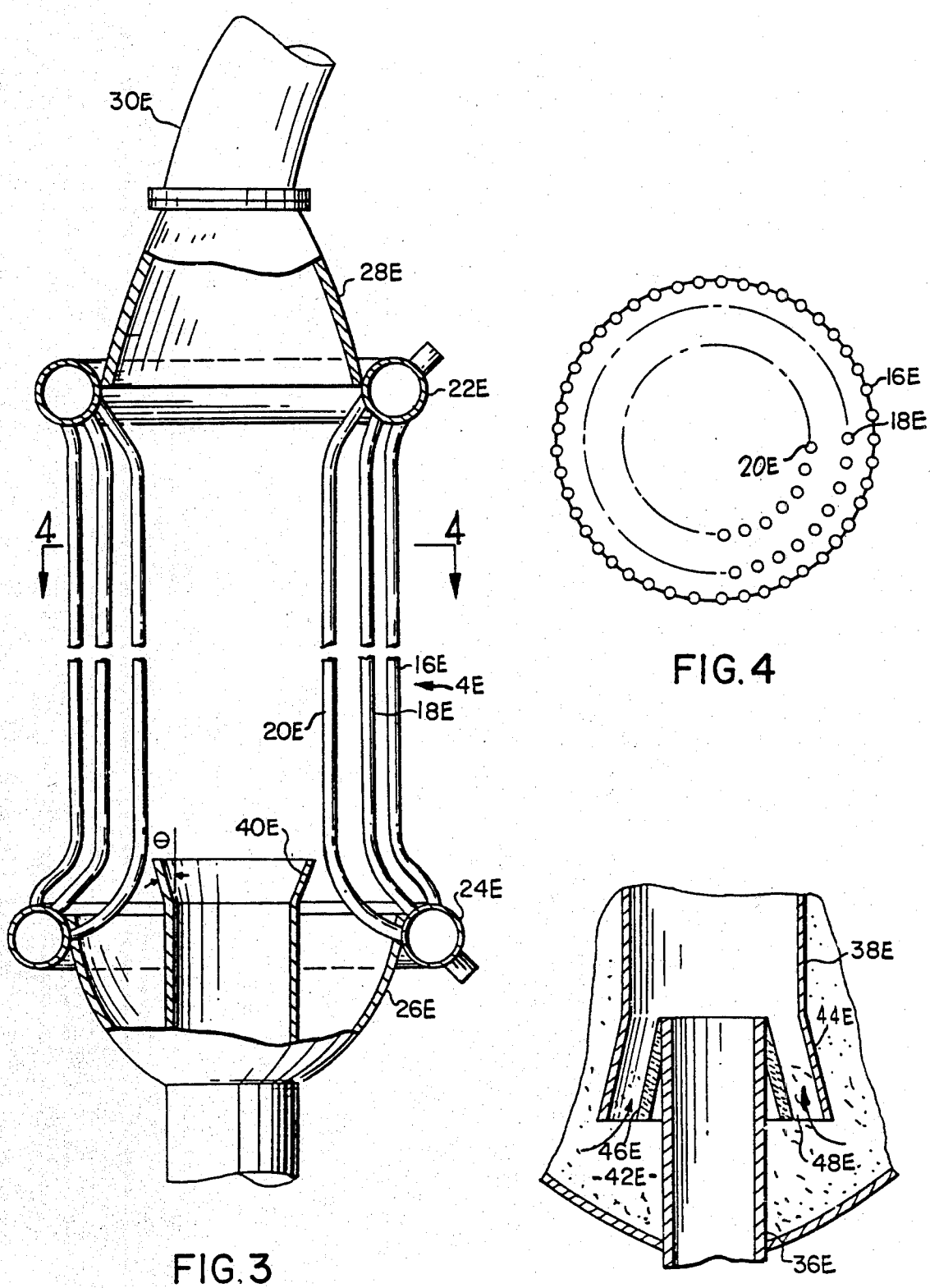
FIG. 3 is a detailed cross sectional elevational view of the quench exchanger of the system.
FIG. 4 is a cross sectional plan view taken through line 4—4 of FIG. 3.
FIG. 5 is a detailed drawing of the reactor outlet and fluid bed quench riser particle entry area.

The quench exchanger 4E as best seen in FIGS. 3 and 4, is formed with a plurality of concentrically arranged circular tubular arrays extending parallel to the longitudinal axis of the quench exchanger 4E. The outer circle of tubes 16E form the outside wall of the quench exchanger 4E. The tubes 16E are joined together, preferably by welding, and form a pressure-tight membrane wall which is in effect, the outer wall of the quench exchanger 4E. The inner circles of tubes 18E and 20E are spaced apart and allow for the passage of effluent gas and particulate solids therearound. The arrays of tubes 16E, 18E and 20E are manifolded to an inlet torus 24E to which boiler feed water is delivered and an upper discharge torus 22E from which high pressure steam is discharged for system service. The quench exchanger 4E is provided with an inlet hood 26E and an outlet hood 28E, to insure a pressure tight vessel. The quench exchanger inlet hood 26E extends from the quench riser 6E to the lower torus 24E. The quench exchanger outlet hood 28E extends from the upper torus 22E and is connected to the downstream piping equipment by piping such as an elbow 30E which is arranged to deliver the cooled effluent and particulate solids to the cyclone separator 8E.

The fluid bed quench riser 6E is essentially a sealed vessel attached in sealed relationship to the quench exchanger 4E. The fluid bed-quench riser 6E is arranged to receive the reactor outlet tube 36E which is preferably centrally disposed at the bottom of the fluid quench riser 6E. A slightly enlarged centrally disposed tube 38E is aligned with the reactor outlet 36E and extends from the fluid bed-quench riser 6E into the quench exchanger 4E. In the quench exchanger 4E, the centrally disposed fluid bed-quench riser tube 38E terminates in a conical opening 40E. The conical opening 40E is provided to facilitate nonturbulent transition from the quench riser tube 38E to the enlarged opening of the quench exchanger 4E. It has been found that the angle of the cone θ, best seen in FIG. 3, should be not greater than 10 degrees.

The fluid bed 42E contained in the fluid bed quench riser 4E is maintained at a level well above the bottom of the quench riser tube 38E. A bleed line 50E is provided to bleed solids from the bed 42E. Although virtually any particulate solids can be used to provide the quench bed 42E, it has been found in practice that the same solids used in the reactor are preferably used in the fluidized bed 42E. Illustrations of the suitable particulate solids are FCC alumina solids.

As best seen in FIG. 5, the opening 48E through which the fluidized particles from the bed 42E are drawn into the quench riser tube 38E is defined by the interior of a cone 44E at the lower end of the quench riser tube 38E and a refractory cone 46E located on the outer surface of the reactor outlet tube 36E. In practice, it has been found that the refractory cone 46E can be formed of any refractory material. The opening 48E, defined by the conical end 44E of the quench riser tube 38E and the refractory cone 46E, is preferably 3-4 square feet for a unit of 50 MMBTU/HR capacity. The opening is sized to insure penetration of the cracked gas solid mass velocity of 100 to 800 pounds per second per square foot is required. The amount of solids from bed 42E delivered to the tube 38E is a function of the velocity of the gas and solids entering the tube 38E from the reactor outlet 36E and the size of the opening 48E.

In practice, it has been found that the Thermal Regenerative Cracking (TRC) reactor effluent will contain approximately 2 pounds of solids per pound of gas at a temperature of about 1,400° F. to 1,600° F.

The process of the solids quench boiler 2E of FIGS. 2–5 is illustrated by the following example. Effluent from a TRC outlet 36E at about 1,500° F. is delivered to the quench riser tube 38E at a velocity of approximately 40 to 100 feet per second. The ratio of pariculate solids to cracked effluent entering or leaving the tube 36E is approximately two pounds of solid per pound of gas at a temperature of about 1,500° F. At 70 to 100 feet per second the particulate solids entrained into the effluent stream by the eductor effect is between twenty five and fifty pounds solid per pound of gas. In 5 milliseconds the addition of the particulate solids from the bed 42E which is at a temperature of 1,000° F. reduces the temperature of the composite effluent and solids to 1,030° F. The gas-solids mixture is passed from the quench riser tube 38E to the quench exchanger 4E wherein the temperature is reduced from 1,030° F. to 1,000° F. by indirect heat exchange with the boiler feed water in the tubes 16E, 18E, and 20E. With 120,000 pounds of effluent per hour, 50 MMBTUs per hour of steam at 1,500 PSIG and 600° F. will be generated for system service. The pressure drop of the gas solid mixture passing through quench exchanger 4E is 1.5 PSI. The cooled gas-solids mixture is delivered through line 30E to the cyclone separator 8E wherein the bulk of the solids is removed from the quenched-cracked gas and returned through line 10E to the quench riser 6E.

We claim:

1. In a TRC apparatus having a reaction cracking chamber and means for quenching the cracked effluent and wherein the temperature in the cracking zone is between 1300° and 2500° F. and wherein the hydrocarbon feed or the hydrosulfurization residual oil along with the entrained inert solids and the diluent gas are passed through the cracking zone for a residence time of 0.05 to 2 seconds, and then quench cooled, the improvement wherein said means for quenching the effluent comprises:
   a. a quench chamber containing a fluidized bed of particulate solids;
   b. a reactor effluent outlet tube extending from said reaction cracking chamber and extending into the fluidized bed;
   c. a riser tube having an inside diameter larger than the outside diameter of the reactor outlet tube aligned with the reactor outlet tube, which riser tube surrounds the reactor outer tube and depends into the fluidized bed below the top of the reactor outlet tube;
   d. an opening defined by the outside of the reactor outlet tube and the inside of the riser tube which opening provides communication between the fluidized bed and the interior of the riser tube; and
   e. an indirect heat exchanger, wherein the riser tube terminates at the entry of the hot side of the indirect heat exchanger.

2. An apparatus as in claim 1 further comprising a diverging cone at the lower end of the riser tube and a converging cone formed on the outer surface of the upper end of the reactor outlet tube.

3. An apparatus as in claim 1 further comprising a diverging cone at the termination of the riser tube terminating at the entry end of the hot side of the indirect heat exchanger.

4. An apparatus as in claim 3 wherein the divergent cone on the riser tube is at an angle to the axis of the riser tube of less than 10°.

5. An apparatus as in claim 1 wherein said indirect heat exchanger comprises:
   a first circular parallel array of vertical tubes joined together to form a pressure-tight outer surface for the indirect heat exchanger; a first torus to which one end of the first circular array of tubes is manifolded; a second torus to which the other end of the first circular array of tubes is manifolded; and means for delivering coolant to the first torus.

6. An apparatus as in claim 5 wherein additional vertically disposed cooling tubes are arranged in concentric circular arrays within said first circular array of tubes.

* * * * *